April 20, 1926. 1,581,581
J. M. B. LEWIS
HEADLIGHT
Filed Feb. 12, 1924 2 Sheets-Sheet 1
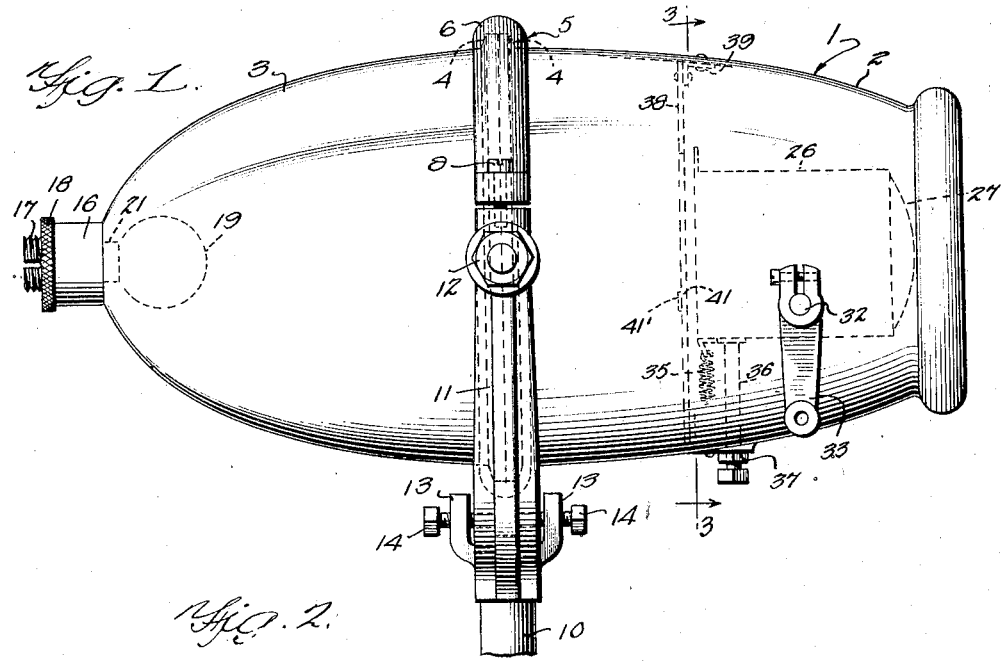
Inventor
J.M.B.Lewis April 20, 1926.
J. M. B. LEWIS
HEADLIGHT
Filed Feb. 12, 1924     2 Sheets-Sheet 2
1,581,581
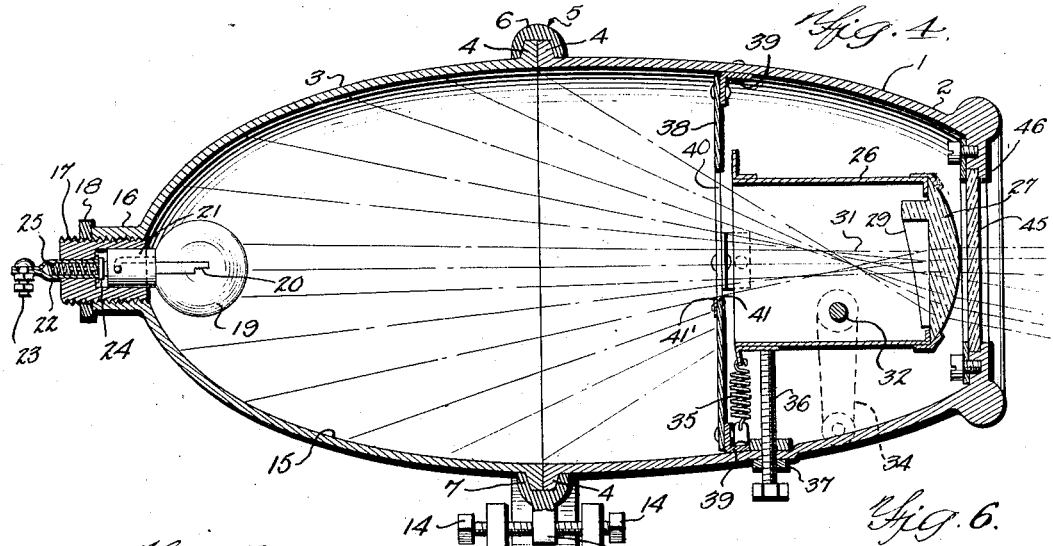
Inventor
J.M.B.Lewis
By
Ch. Parkin    Attorney Patented Apr. 20, 1926.

1,581,581

UNITED STATES PATENT OFFICE.

JOHN MINOR BOTTS LEWIS, OF LYNCHBURG, VIRGINIA.

HEADLIGHT.

Application filed February 12, 1924. Serial No. 692,411.

*To all whom it may concern:*

Be it known that I, JOHN M. B. LEWIS, a citizen of the United States, residing at Lynchburg, State of Virginia, have invented certain new and useful Improvements in Headlights, of which the following is a specification.

This invention relates to headlights and more particularly to automobile headlights embodying novel means whereby glare in the eyes of approaching drivers is positively eliminated.

An important object of the present invention is to provide a headlight adapted to project a beam of light, the upper limit of which will be sharply defined at the legal distance above the road.

A further object of the invention is to provide a headlight adapted to project a beam of light which will efficiently light the road for driving purposes.

A further object of the invention is to provide means for dipping the beam of light to lower the upper limit of the beam when approaching the brow of the hill to prevent glare in the eyes of approaching drivers without diminishing the intensity of the light.

A further object of the invention is the provision of a headlight structure of the so called "fixed focus" type wherein accurate focusing of the light source is unnecessary in preventing the projection of glaring rays.

Other objects and advantages of the invention will be apparent during the course of the following description.

In the drawings I have shown several embodiments of the invention. In this showing, Figure 1 is a side elevation of the device, Figure 2 is a front elevation of the same, Figure 3 is a section on line 3—3 of Figure 1, Figure 4 is a central vertical longitudinal sectional view, Figure 5 is a detail perspective of the light shield, Figure 6 is a rear perspective of the lens, Figure 7 is a detail horizontal sectional view through the lens, Figure 8 is a central horizontal sectional view through a modified form of lens carrier, Figure 9 is a transverse vertical section through the same, and, Figure 10 is a diagrammatic view showing the light distribution in normal and tilted positions.

Referring to the drawings the numeral 1 designates a headlight casing as a whole comprising forward and rear casing sections 2 and 3 respectively. The casing is circular in cross section and as shown in Figure 4 the abutting edges of the casing sections 2 and 3 are provided with tapered annular flanges 4 adapted to be received within a grooved band 5 which is split to provide upper and lower complementary sections 6 and 7 respectively. The adjacent edges of the band sections are arranged on opposite sides of the casing and the sections are adapted to be secured together by screws 8. It will be apparent that the casing sections are adapted to be securely held in proper position by the band 5. The lower band section 7 is provided at its lower central portion with a depending finger 9 as clearly shown in Figure 4.

The numeral 10 designates a standard of any suitable type mounted upon an automobile and provided with a yoke 11 extending on opposite sides of the headlight and connected therewith by bolts 12 secured to the lower band section 7 upon opposite sides thereof. As shown in Figure 4, a pair of upwardly extending arms 13 are carried by the yoke adjacent its central portion and these arms are spaced from the finger 9 forwardly and rearwardly thereof. Each of the arms 13 is provided with a screw 14 and the inner ends of these screws are adapted to contact with the finger 9. It will be apparent that adjustment of the screws permits the lamp casing as a whole to be swung through the arc of a circle within reasonable limits to permit adjustment thereof.

The rear casing section 3 is preferably provided with an inner plated and highly polished elliptical surface 15 adapted to serve as a reflector for converging rays of light as will be obvious. The casing section 3 is provided with an axial extension 16 threaded internally to receive a socket plug 17, a lock nut 18 being provided for securing the plug 17 in desired positions. The numeral 19 designates a light source having a filament 20. The base 21 of the bulb 19 is received within the plug 17 and is secured therein by the usual pin and bayonet slot construction. A tubular member 22 is mounted in a reduced axial opening in the plug 17 and is provided at its rear end with a suitable binding post 23 adapted for connection with the source of current, it being understood that the base of the bulb 19 is grounded upon the plug 17, the casing of the headlight, and the frame of the automobile as will be understood. The base contact of the lamp is adapted to receive its current from a slidable contact 24 normally projected inwardly by a spring 25 as shown in Figure 4. It will be apparent that the plug 17 may be adjusted inwardly or outwardly to secure the most efficient focus of the filament 20 within the reflector 15 as will be understood. While I have described the reflector 15 as being elliptical in shape it is to be understood that I may employ a reflector formed as a surface of revolution of any desired shape, such as a prolate spheroid, in order that the rays from the reflector may be converged forwardly to an approximate focal point.

The numeral 26 designates a lens holding member which is preferably formed of relatively thin metal and is square in cross section as shown in Figure 3. The forward end of the lens holder is adapted to support a lens 27 of the astigmatic type, the outer face of the lens preferably being formed of a section of a cylinder as shown in Figures 4 and 6. The rear face of the lens 27 is flat throughout the greater portion of its area as shown in Figures 4 and 6 and is provided upon opposite sides with prisms 28 preferably molded integral with the glass of the lens. As shown in Figure 6 the rear faces of the prisms are flat but their inner edges are curved outwardly and downwardly as shown at 29. The numeral 30 designates the outer limits of the beam of light as it enters the lens 27. The rays of light from the reflector 15 converge as at 31 (see Figure 4) it being obvious that no perfect focal point will be obtained due to natural inaccuracies in the filament position and reflector surface. It will be seen therefore that the rays of light at the focusing area 31 are circular in cross section and the beam of light as a whole is of substantial diameter. It will be obvious that the rays which converge at 31 will diverge as they pass this area, the light passing between the prisms 28 being permitted to continue their divergence while the light passing through the prisms 28 will be refracted inwardly to limit the spread of the resulting beam.

The lens holder 26 is supported upon a shaft 32 mounted in bearings 33 carried by the forward casing section 2 as shown in Figure 3. Externally of the casing the shaft 32 is rigidly connected with a lever 34 adapted to be operated in any suitable manner from the driver's seat. A spring 35 of the retractile type is connected between the rear end of the lens holder and the forward casing section to normally urge the lens 27 upwardly. A screw 36 is arranged between the shaft 32 and the rear end of the lens holder 26. This screw has threaded connection with the forward casing section as shown and is provided with a lock nut 37 for securing it in desired positions. As shown in Figure 4, the upper end of the screw 36 contacts with the lower surface of the lens holder 26 to limit the downward movement of the rear end thereof and consequently the upward movement of the lens 27.

As shown in Figure 4, the rear end of the lens holder 26 is open and a light screen 38 is mounted rearwardly of the open end of the lens holder, the screen 38 being rigidly connected with the forward casing section by brackets 39. As shown in Figure 5, the screen 38 is provided with a substantially rectangular opening 40, the lower edge 41 of which intercepts the lower rays from the reflector 15. As is well known the most intense rays from an elliptical reflector are those reflected from the portions nearest the axis of the reflector and it accordingly will be seen that the lower edge 41 of the aperture 40 will intercept the less intense rays from the reflector 15 thus resulting in a negligible loss of light. The lower edge 41 of the aperture 40 is adapted to intercept rays upwardly from the bottom of the beam from the reflector 15, to a point where these rays are becoming most intense and since the rays cross substantially at the area 31 it will be apparent that the screen provides a sharp line of demarcation between the light and dark areas at the upper limit of the beam projected from the headlight. A color filter 41' preferably in the form of a narrow strip of blue celluloid or other transparent or transulcent material, is secured to the screen 38 in such a manner as to project upwardly beyond the edge 41 a slight distance to correct aberration color as will become apparent. The upper limit of the beam resulting from the cutting off of the lower rays by the screen 38 will form a substantially horizontal line as indicated at 42 in Figures 6 and 10. The rays passing between the prisms 28 will not be refracted inwardly horizontally but will continue to diverge to a beam width as indicated by the lines 43 in Figure 10 which indicates the shape of the beam at a substantial distance in front of the automobile. The rays will be refracted inwardly vertically by virtue of the cylindrical shape of the forward face of the lens 27 so that the vertical limits of the beam will be as defined by the lines 42 and 44 in Figure 10, the screen 38 limiting the upward limit of the beam as will be obvious.

As shown in Figure 4, the forward end of the casing section 2 is provided with a plain glass protector 45 which has no refractive influence upon the light beam as will be understood. The forward end of the casing is formed with a flange 46 which serves to hold the glass in position and this flange may be formed with a rectangular aperture 47 to conform generally to the outline of the lens 27 to improve the appearance of the lamp, but it will be obvious that the shape of the opening 47 is immaterial.

In Figures 8 and 9, of the drawings, I have shown a modified form of lens holder wherein a cylindrical lens 27 is employed without the refracting prisms 28. In order to prevent undue spread of the light in the modified form of lens holder I provide a pair of plane reflectors 48 tilted as shown in Figures 8 and 9 to intercept substantially the same rays of the light beam as will be intercepted by the prisms 28 in the form previously described. The light rays intercepted by the reflectors 48 will be reflected inwardly to form a resulting beam which will be similar in shape to the beam shown in Figure 10, previously described, except as to the shape of the outer limits 43.

The operation of the device is as follows:

The filament of the lamp 19 is preferably properly focussed in order to secure the highest degree of efficiency but accurate focussing is not essential to the operation of the device inasmuch as slight inaccuracy will not materially decrease the light intensity and the upper limit of the beam under any conditions will be sharply defined by the screen 38 to secure a sharp "cut off" which is highly essential in a nonglare light. The rays of light from the reflector 15 will be more or less accurately focused at the area 31, the light at this area under even favorable conditions being of material diameter. After passing the area 31 the light will diverge until it passes through the lens 27. As previously stated the light passing between the prisms 28 will not be affected by the lens to any material extent as far as horizontal spread is concerned while the light passing through the prisms will be refracted inwardly to confine them within the horizontal limits designated by the lines 43 in Figure 10. Due to the refraction of the prisms 28 and the fact that the center rays from the elliptical reflector 15 will form the most intensive illumination in the beam, it will be obvious that the beam designated by the lines 42, 43 and 44 in Figure 10 will be most intense adjacent the upper portion of the beam and principally confined within the width of the road. As will be understood the vertical depth of the beam will be governed by the refraction of the lens 27 but under any conditions the upper limit will be sharply defined by virtue of the interception of light rays by the screen 38. The distribution of light just described provides for a beam having its most intensive portion adapted for lighting the roadway a material distance from the front of the automobile. As shown in Figure 10, greater spread is permitted at the lower portion of the beam for lighting the road close to the machine and for lighting ditches, etc., which is highly desirable. While the lower rays of the beam are of less intensity than the upper rays they illuminate the road and adjacent ground at points much closer to the automobile so that their intensity is ample to provide efficient light for driving purposes. It has been found that prismatic aberration of the lens causes a slight cast of red light at the upper limit of the beam and I provide the translucent strip 41' for the purpose of absorbing the red color of the light rays which normally form the upper limit of the beam.

It will be obvious that the limit of the beam defined by the screen 38 may be adjusted as to height and it should preferably be substantially horizontal or even slope downwardly to a very slight degree. Adjustment as to the upper limit of the beam may be accomplished by adjusting the screws 14 and when an approximate adjustment has been secured the screws 14 are preferably tightened. The screw 36 then may be revolved in either direction necessary to secure a fine adjustment and the adjustment may be accurately determined as to height due to the sharp upper limit of the beam. The darkened upper area due to the interception of light by the screen 38 prevents glare in the eyes of drivers approaching in an opposite direction when driving on substantially level roads. When driving on an incline and approaching the top of a hill the beam of light may be dipped a substantial distance by operating the lever 34 from the driver's seat to swing the lens 27 downwardly. This action results in refracting the beam downwardly at a substantial angle but does not decrease the intensity of illumination since all the rays of light previously employed are still cast upon the road. When the lens 27 is tilted downwardly the resulting beam will be shaped as defined by the lines 49 and 50.

While I have described the resulting beam from the headlight as being defined normally by the lines 42, 43 and 44 it will be obvious that only one limit of the beam will be sharply defined, namely the upper limit 42. From the lines 42 inwardly the light rays will materially increase in intensity and outwardly of these lines the intensity will diminish so that in reality there are no sharply defined outer horizontal limits. Regardless of the degree of intensity of the outer rays, however, none of the rays under any conditions can be projected upwardly beyond the line 42. In the form of the device shown in Figures 8 and 9, the distribution of light will be substantially the same as in the form previously described except that the outer rays of light will be reflected inwardly by the reflectors 48 instead of being refracted as in the case of the prisms 28.

It is to be understood that the forms of my invention herewith shown and described are to be taken as preferred examples of the same, and that various changes in the shape, size and arrangement of parts may be resorted to without departing from the spirit of the invention or the scope of the subjoined claims.

Having described my invention, I claim:

1. A device of the character described comprising a light converging reflector having principal and conjugate foci, a light source arranged at the principal focus of said reflector and an astigmatic lens arranged near the conjugate focus of said reflector, and in the path of light from said light source and said reflector, said lens having its shortest radius of curvature arranged vertically, a screen arranged in the path of rays normally forming the upper portion of the light beam, said screen being arranged a substantial distance from the conjugate focus of said reflector, and means for partially absorbing aberration color at the upper limit of the light beam defined by said screen.

2. A device of the character described comprising a light converging reflector having principal and conjugate foci, a light source arranged at the principal focus of said reflector, a lens holder, means for pivotally supporting said lens holder, an astigmatic lens carried by said lens holder near the conjugate focus of said reflector and in the path of light from said light source and said reflector, means for tilting said lens holder in one direction about a horizontal axis, means for limiting the movement of said lens holder in the opposite direction, means for resiliently opposing tilting of said lens holder, and a stationary screen arranged in the path of rays normally forming the upper portion of the resultant light beam, said screen being spaced from the conjugate focus of said reflector.

In testimony whereof I affix my signature.

JOHN MINOR BOTTS LEWIS.